US009483446B2

(12) United States Patent
Morita

(10) Patent No.: US 9,483,446 B2
(45) Date of Patent: Nov. 1, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keisuke Morita, Tokyo (JP)

(73) Assignee: Canon Kabushiki Kiasha, Tokyo (JP)

( * ) Notice: Subject to any disclaimer, the term of this patent is extended or adjusted under 35 U.S.C. 154(b) by 619 days.

(21) Appl. No.: 13/776,482

(22) Filed: Feb. 25, 2013

(65) Prior Publication Data
US 2013/0227400 A1   Aug. 29, 2013

(30) Foreign Application Priority Data

Feb. 29, 2012   (JP) .................................. 2012-043793

(51) Int. Cl.
*G06F 3/00*   (2006.01)
*G06F 17/21*   (2006.01)
*G06F 3/12*   (2006.01)

(52) U.S. Cl.
CPC ............. *G06F 17/217* (2013.01); *G06F 3/125* (2013.01); *G06F 3/1219* (2013.01); *G06F 3/1285* (2013.01)

(58) Field of Classification Search
CPC ..... G06K 9/00463; G06F 17/21; G06F 8/33; G06F 17/211; G06F 17/217; G06F 17/24; G06F 3/0481; G06F 3/125; G06F 3/1219; G06F 3/1285
See application file for complete search history.

(56) References Cited

U.S. PATENT DOCUMENTS

| 8,804,139 | B1* | 8/2014 | Arora et al. ................... 358/1.1 |
| 2003/0088825 | A1* | 5/2003 | Chakraborty ................. 715/500 |
| 2007/0285724 | A1* | 12/2007 | Saito ........................... 358/1.18 |
| 2010/0067055 | A1 | 3/2010 | Toda | |

FOREIGN PATENT DOCUMENTS

| CN | 101494709 A | 7/2009 |
| CN | 101848297 A | 9/2010 |
| JP | 04008628 B2 | 11/2007 |
| JP | 2010-231379 A | 10/2010 |

\* cited by examiner

*Primary Examiner* — Kyle Stork
(74) *Attorney, Agent, or Firm* — Canon U.S.A., Inc. IP Division

(57) ABSTRACT

An information processing apparatus includes an extraction unit configured to scan document data in a direction from a first page to a last page to extract a first page range required for reducing one page and to scan the document data from the last page in the first page range in a direction opposite to the direction of scanning the first page range to extract a second page range required for reducing one page, and a page reduction unit configured to execute page reduction processing by reducing a blank region included in a page in the second page range if a number of pages included in the second page range is smaller than a number of pages included in the first page range.

15 Claims, 19 Drawing Sheets

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

Conventionally, page reduction processing is performed for the purpose of reducing the number of printed sheets which are output when document data is printed. For example, Japanese Patent Application Laid-Open No. 2010-231379 discusses a page reduction method that generates a blank page by, for example, removing a space between lines or illustrations and deletes the generated blank page. According to the technique discussed in Japanese Patent Application Laid-Open No. 2010-231379, whether a sufficient blank space for re-layout is included in a selected page is first determined. Then, if it is determined that a sufficient blank space is not available, a blank space which can be used for re-layout is searched in the subsequent pages. If such a blank space in the selected page is available, the space is moved to a target page. According to such processing, a user does not need to confirm the state of object arrangement in a page or does not need to determine point by point the combination of pages which can be laid out again. However, according to Japanese Patent Application Laid-Open No. 2010-231379, since the above-described processing is performed from the top of the document in order, even a region, which is not a page-reducible target, is subject to processing wastefully.

SUMMARY OF THE INVENTION

The present invention is directed to an information processing apparatus that realizes efficient page reduction processing.

According to an aspect of the present invention, an information processing apparatus includes an extraction unit configured to scan document data in a direction from a first page to a last page to extract a first page range required for reducing one page and to scan the document data from the last page in the first page range in a direction opposite to the direction of scanning the first page range to extract a second page range required for reducing one page, and a page reduction unit configured to execute page reduction processing by reducing a blank region included in a page in the second page range if a number of pages included in the second page range is smaller than a number of pages included in the first page range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
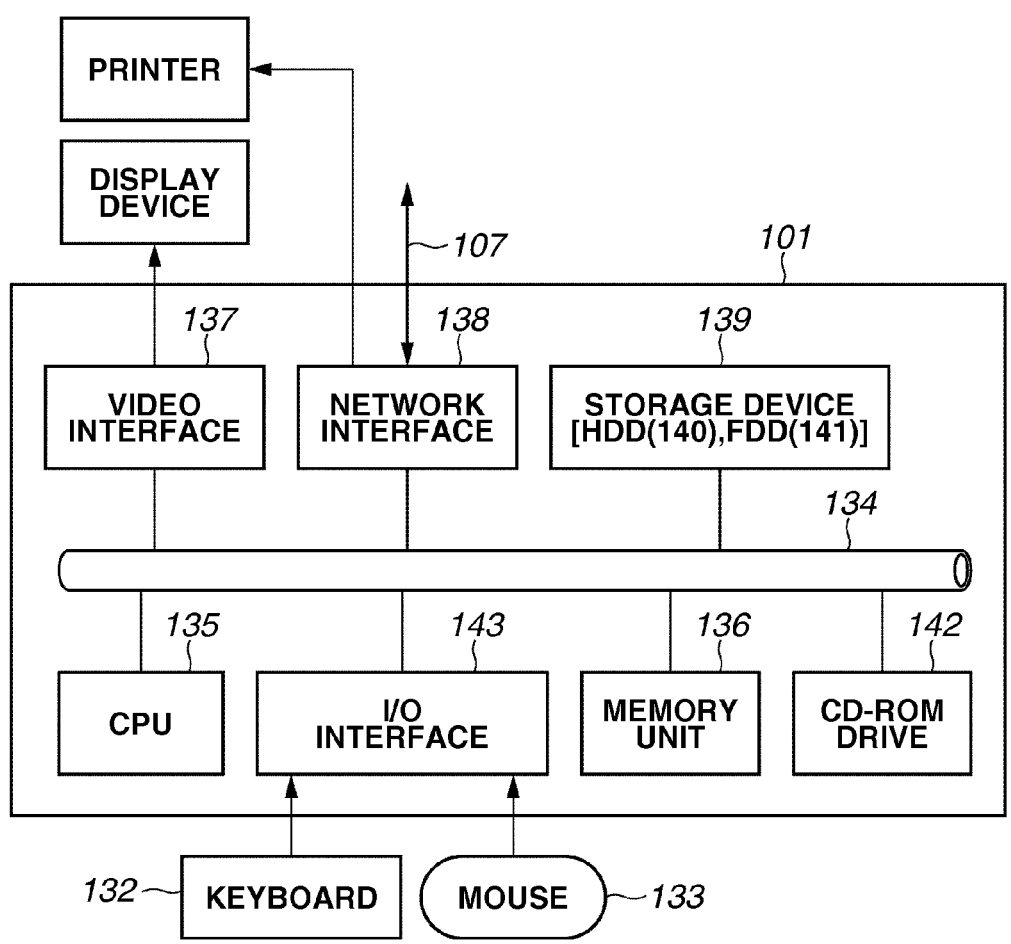
FIG. 1 illustrates an example of a hardware configuration of a document processing system according to a first exemplary embodiment of the present invention.

FIG. 1 illustrates an example of a hardware configuration of a document processing system according to a first exemplary embodiment of the present invention.

A system including a computer 101 will be used as an example of the document processing system. Data is input in the computer 101 and edited via a keyboard 132 or a pointing device such as a mouse 133. The computer 101 typically includes at least one central processing unit (CPU) 135 and a memory unit 136 including a random access memory (RAM) and a read-only memory (ROM). Additionally, the computer 101 includes a video interface 137 and an I/O interface 143 for the keyboard 132 and the mouse 133. Further, the computer 101 includes a storage device 139 such as a hard disk drive 140 or a solid state drive (SSD) 141. An operation system such as LINUX (registered trademark) or Windows (registered trademark) is stored in the storage device 139. Further, the computer 101 includes a network interface 138. The computer 101 is connected to a network 107 or a printer via the network interface 138.

The software configuration of the computer 101 and processing of the flowcharts described below are realized by the CPU 135 executing a program stored in a storage device 139.

Except where specifically noted, as long as a function of the embodiments are executed, the present invention can be applied not only to a single apparatus but to a system including a plurality of apparatuses. Additionally, the software (program) which is executed can be a computer printer driver in the system or a program in an operating system running on a printing apparatus such as a printer. Further, except where specifically noted, as long as a function of the present invention is executed, the present invention can be applied to a system which is connected to and processed via a network, such as a local area network (LAN) or a wide area network (WAN).

The computer 101 is an example of an information processing apparatus.

Before describing the present embodiment, page reduction processing as basic processing of the present invention is described.

Figure 2:
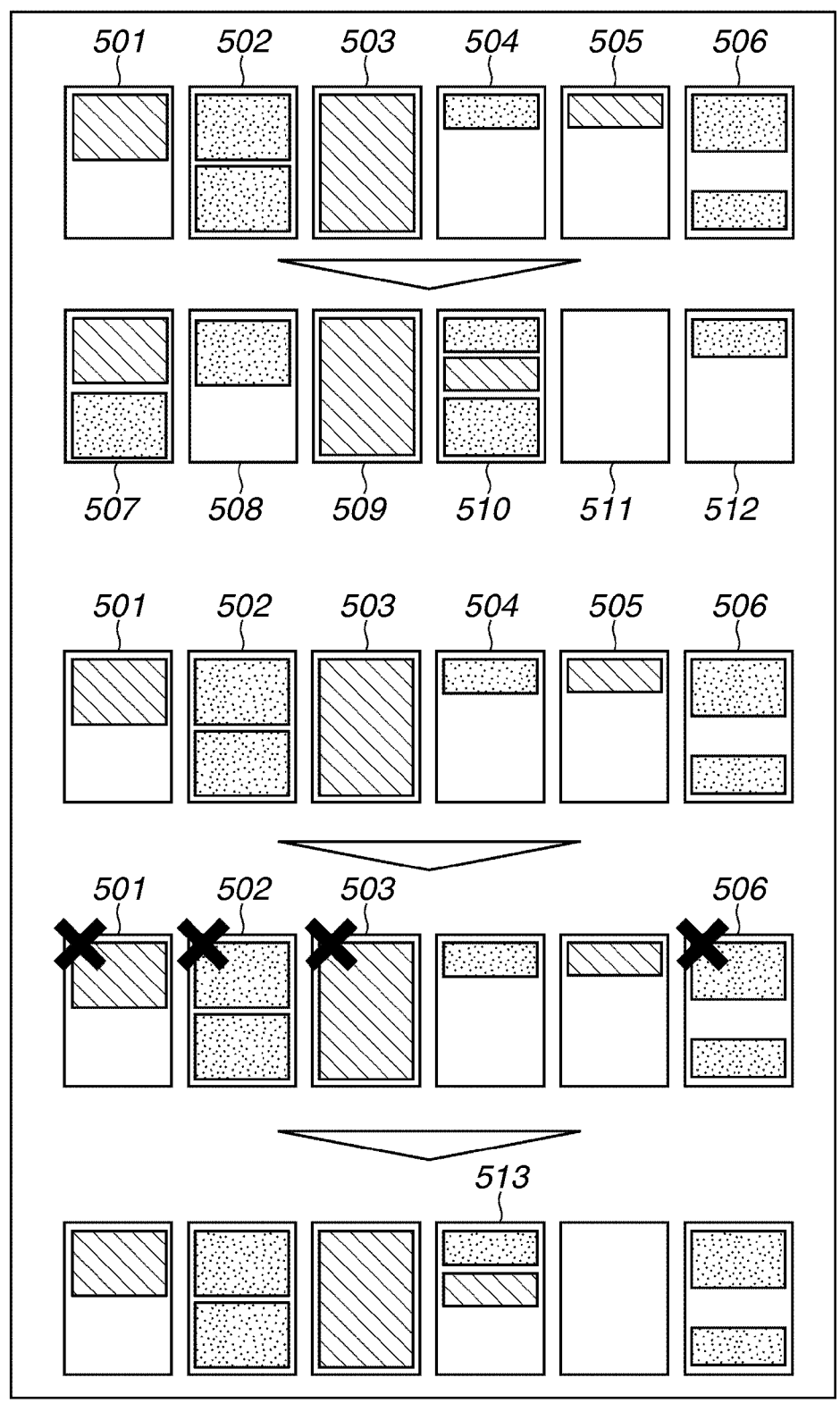
FIG. 2 illustrates blank portion reduction processing used in page reduction processing.

First, blank portion reduction processing used in the page reduction processing will be described with reference to pages 501 and 502 in FIG. 2.

The blank portion reduction processing is to re-lay out an object in a page so that the object is filled into a blank portion between lines or paragraphs in a page. The computer 101 moves the object in the upper portion of page 502 so that the object fills the blank portion in the lower portion of page 501. Then, the computer 101 moves the object in the lower portion of page 502 to the upper portion of the page. Accordingly, pages 507 and 508 are obtained. Processing used for reducing a blank portion in a page in this manner is called the blank portion reduction processing. According to this processing, when an object is moved to a different page, page 508 as the page before the object is moved is called an original page and page 507 as the page after the object is moved is called a destination page.

The page reduction processing is processing that repeats the blank portion reduction processing described above until a blank page is generated or the processing page reaches the last page. When pages 501 to 506 are subject to the page reduction processing, pages 507 to 512 are obtained as a result of the processing. A blank page herein indicates a page with no contents after the processing, such as page 511.

The computer 101 considers a page only including an invisible object such as a blank space, an image detected as a background, or a header/footer which is not an editing target, as a blank page. An object herein indicates a character or a vector drawing. Further, in the following exemplary embodiments, the computer 101 considers a group of objects as one object. Additionally, in the exemplary embodiments described below, the computer 101 considers information added to a region other than a body text of a document, such as notes of the document, as an object if the information can be considered as an editing target.

Figure 3:
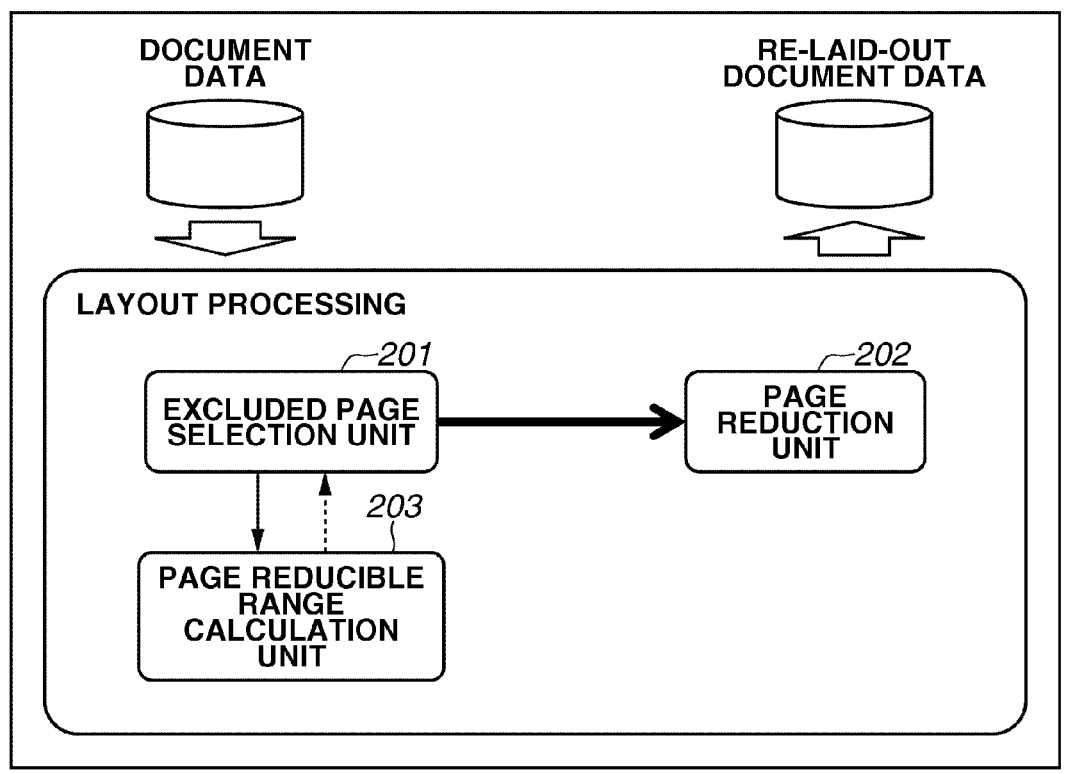
FIG. 3 illustrates a software configuration regarding main processing of a computer according to the present embodiment.
Figure 4:
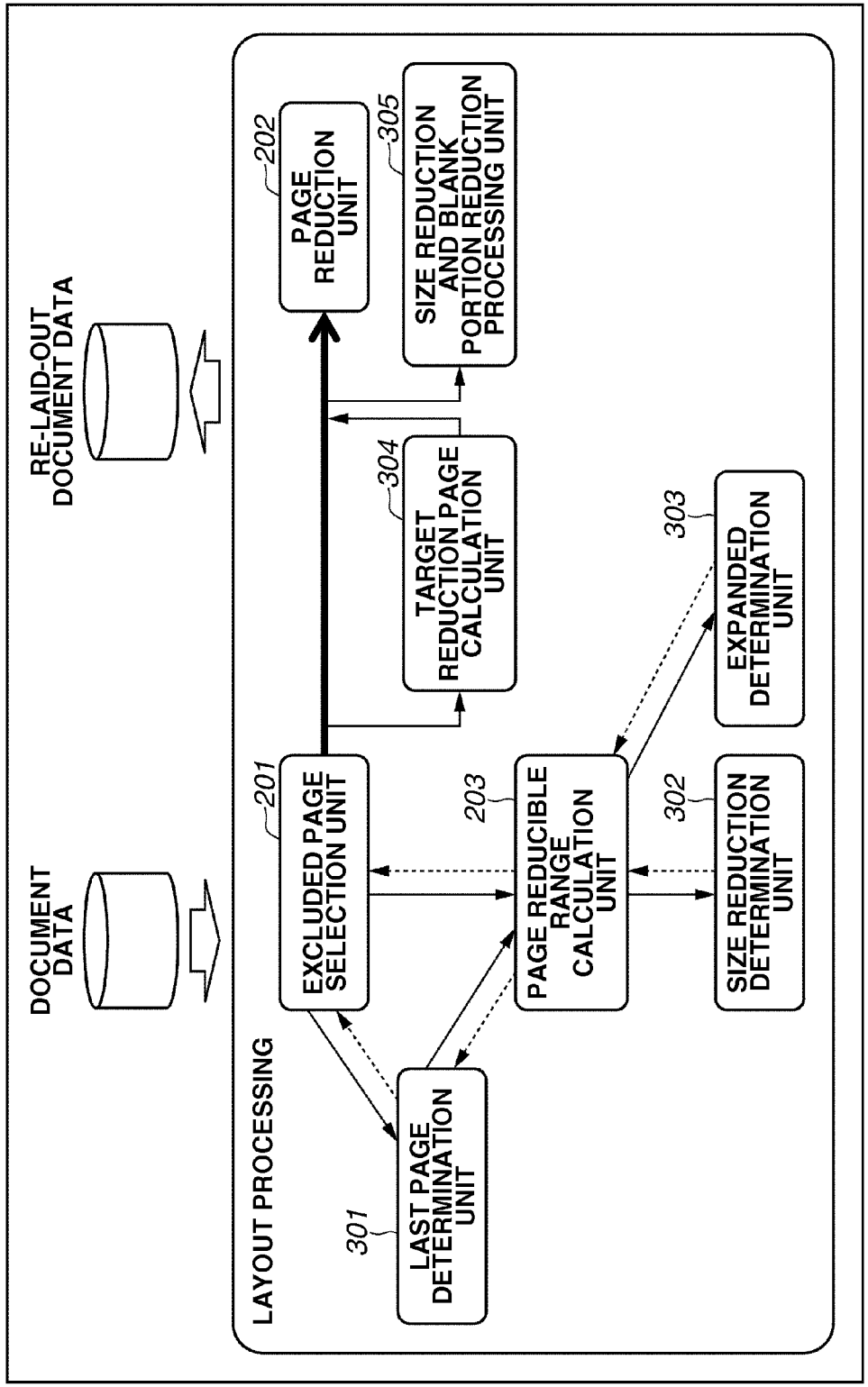
FIG. 4 illustrates the software configuration including software regarding processing associated with the main processing.

FIGS. 3 and 4 illustrate examples of a software configuration of the computer 101. The software configuration will be described with reference to FIG. 2. FIG. 3 illustrates a software configuration regarding main processing of the computer 101 according to the present embodiment. FIG. 4 illustrates a software configuration including software regarding processing associated with the main processing. According to the example in FIG. 2, pages 507 to 512 are obtained when pages 501 to 506 are subjected to the page reduction processing. Thus, one page is reduced as a result of processing of six pages. However, if the purpose of the page reduction processing is to reduce one page from pages 501 to 506, all that is necessary is to move the object in page 505 to the lower portion of page 504. In other words, moving the object between page 502 and page 501 and moving the object in page 506 will be unnecessary.

Thus, an excluded page selection unit 201 extracts a page, which is not required for the page reduction processing, from data of a document including a plurality of pages. According to the example in FIG. 2, pages 501 to 503 and 506 are excluded from the target of the page reduction processing.

By using this result, a page reduction unit 202 performs the page reduction processing. In this case, only pages 504 and 505 are the target of the processing. Then, page 513 is obtained as a result of the processing. The excluded page selection unit 201 internally invokes a reducible page range calculation unit 203. The reducible page range calculation unit 203 searches a page range necessary for reducing one page starting from the starting page. According to the example in FIG. 2, the page range is from page 501, as the starting page in FIG. 2, to page 505, which will be the first blank page, as the end page of the range. The calculation method will be described in detail below. The main processing of the layout processing of the present embodiment is to perform such processing. According to such processing, the effect of the page reduction can be obtained with the minimum processing.

Further, the reducible page range calculation unit 203 can invoke, as needed, a last page determination unit 301, a size reduction determination unit 302, and an expanded determination unit 303. Processing of these units will be described below according to a third and a fourth exemplary embodiments of the present invention. A target reduction page calculation unit 304 calculates a number of pages, which is maximally reduced and optimized for a designated layout such as a print layout with a plurality of pages laid out on one sheet. The page reduction unit 202 performs the page reduction processing so that the number of pages to be printed is reduced to the target number of pages. Details of this processing performed by the target reduction page calculation unit 304 will be described below in a second exemplary embodiment. A size reduction and blank portion reduction processing unit 305 performs blank portion reduction processing while performing size reduction processing of an object in a page as need arises. Details of the processing performed by the size reduction and blank portion reduction processing unit 305 will be described according to a fifth exemplary embodiment described below.

Figure 5:
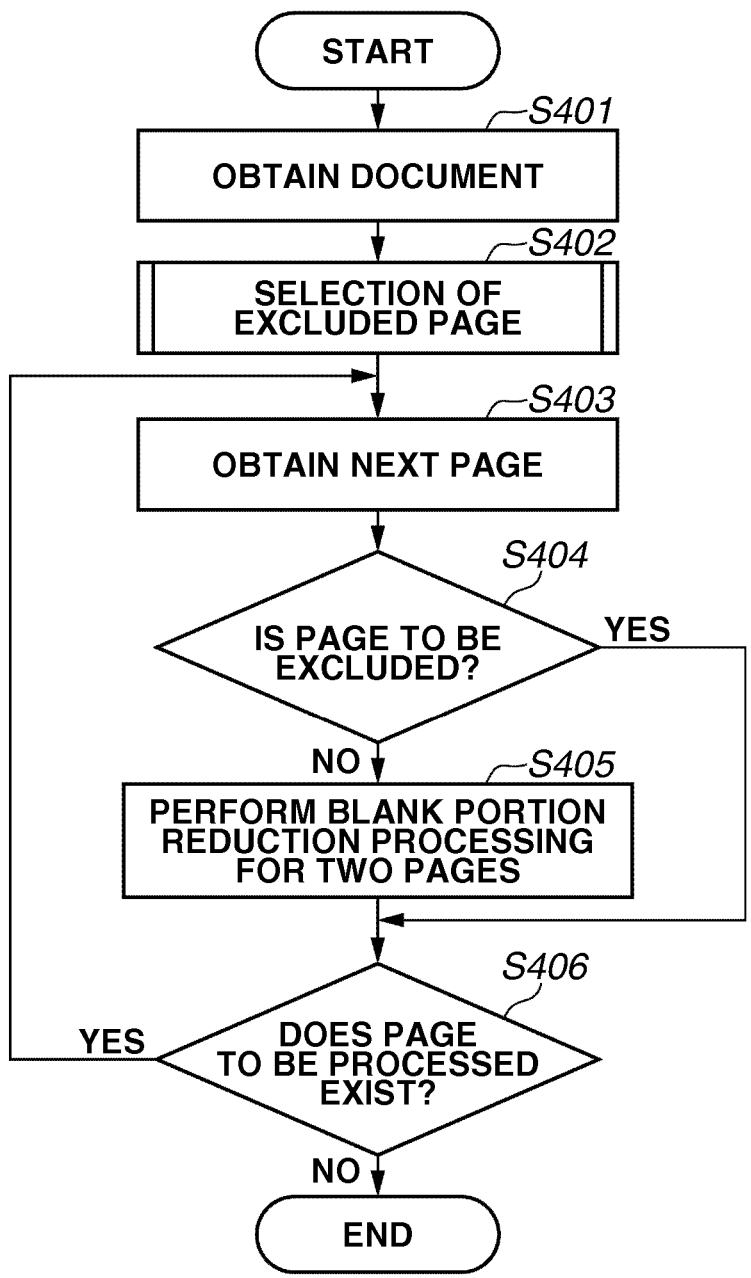
FIG. 5 is a flowchart illustrating an example of main processing of layout processing.

FIG. 5 is a flowchart illustrating an example of main processing of the layout processing. This processing will be described with reference to FIG. 2. Since detailed processing is described below, only the outline of the processing is described.

In step S401, the CPU 135 obtains a document. The CPU 135 reads data of the document from the storage device 139 or via the network interface 138 and stores the obtained data in the memory unit 136.

In step S402, the CPU 135 selects excluded pages. For example, the CPU 135 selects pages 501 to 503 and 506 from the document including pages 501 to 506 in FIG. 2. Then, the CPU 135 sets a flag indicating an excluded page to the pages of the document data stored in the memory unit 136, as information for identifying the selected pages. This data can be stored in the memory unit 136 as a list of excluded pages. More specifically, the processing in this step is performed by the excluded page selection unit 201.

In step S403, the CPU 135 obtains the next page to be processed. According to this processing, basically, unprocessed pages are read in order from the page nearest to the top page of the document. In other words, after a destination page nearest to the top page is read, an original page subsequent to the destination page is read. Exceptionally, if the original page is a blank page such as page 511, not a page subsequent to the destination page but a page subsequent to the blank page, for example, page 512, is read.

In step S404, the CPU 135 determines whether the page which has been read is to be an excluded page. If either the destination page or the original page is set as an excluded page (YES in step S404), the processing proceeds to step S406.

If neither the destination page nor the original page is set as an excluded page (NO in step S404), the processing proceeds to step S405. In step S405, the CPU 135 performs the blank portion reduction processing for the destination page and the original page.

In step S406, the CPU 135 determines whether a page to be processed exists. If a page to be processed exists (YES in step S406), the processing returns to step S403 and reading of the next page is performed. If there is no page to be processed (NO in step S406), the processing in FIG. 5 ends.

According to the above-described processing, the page reduction can be performed with unnecessary blank portion reduction processing.

Figure 6:
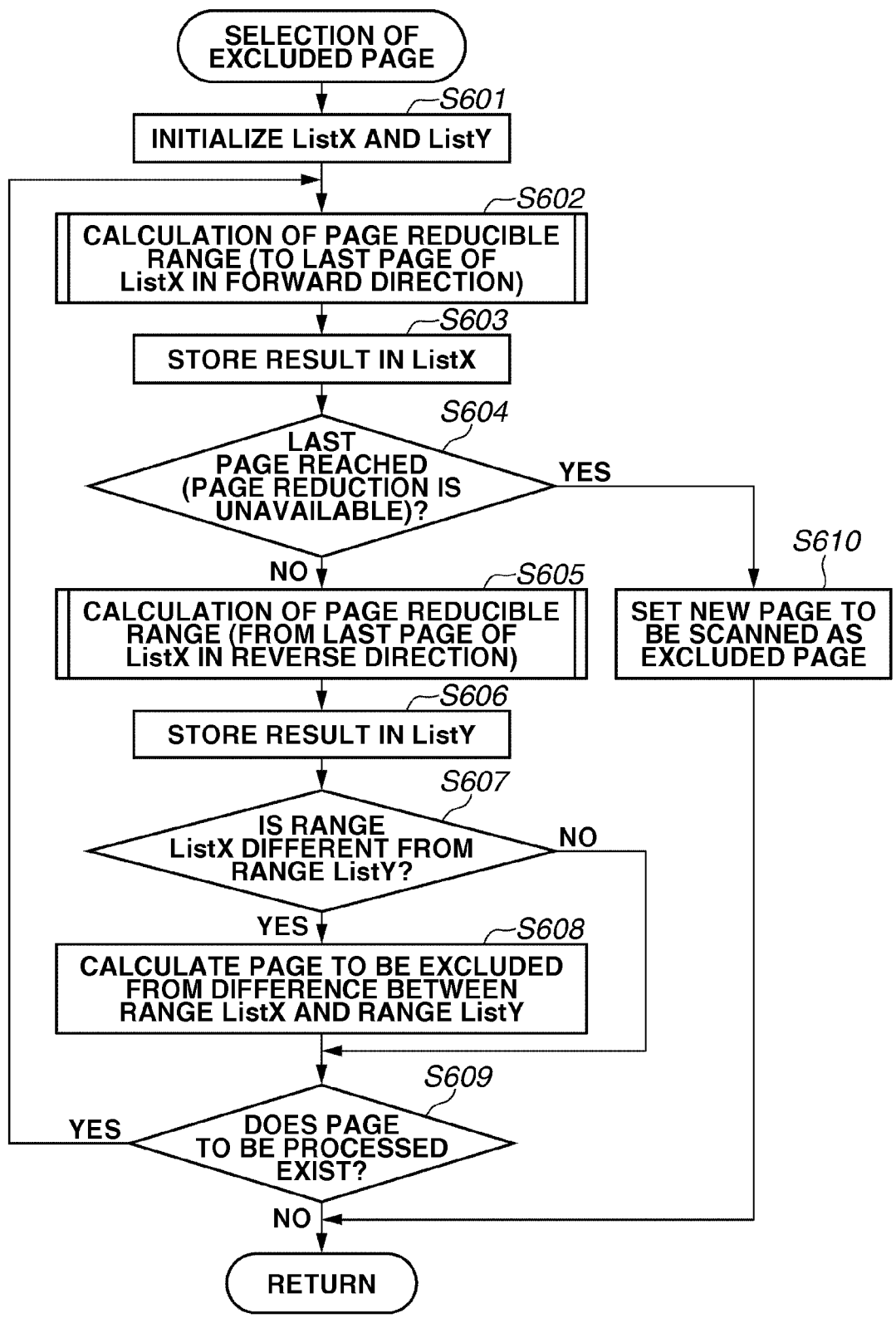
FIG. 6 is a flowchart illustrating details of excluded page selection processing.

FIG. 6 is a flowchart illustrating details of the processing in step S402. The processing will be described with reference to FIG. 7.

Figure 7:
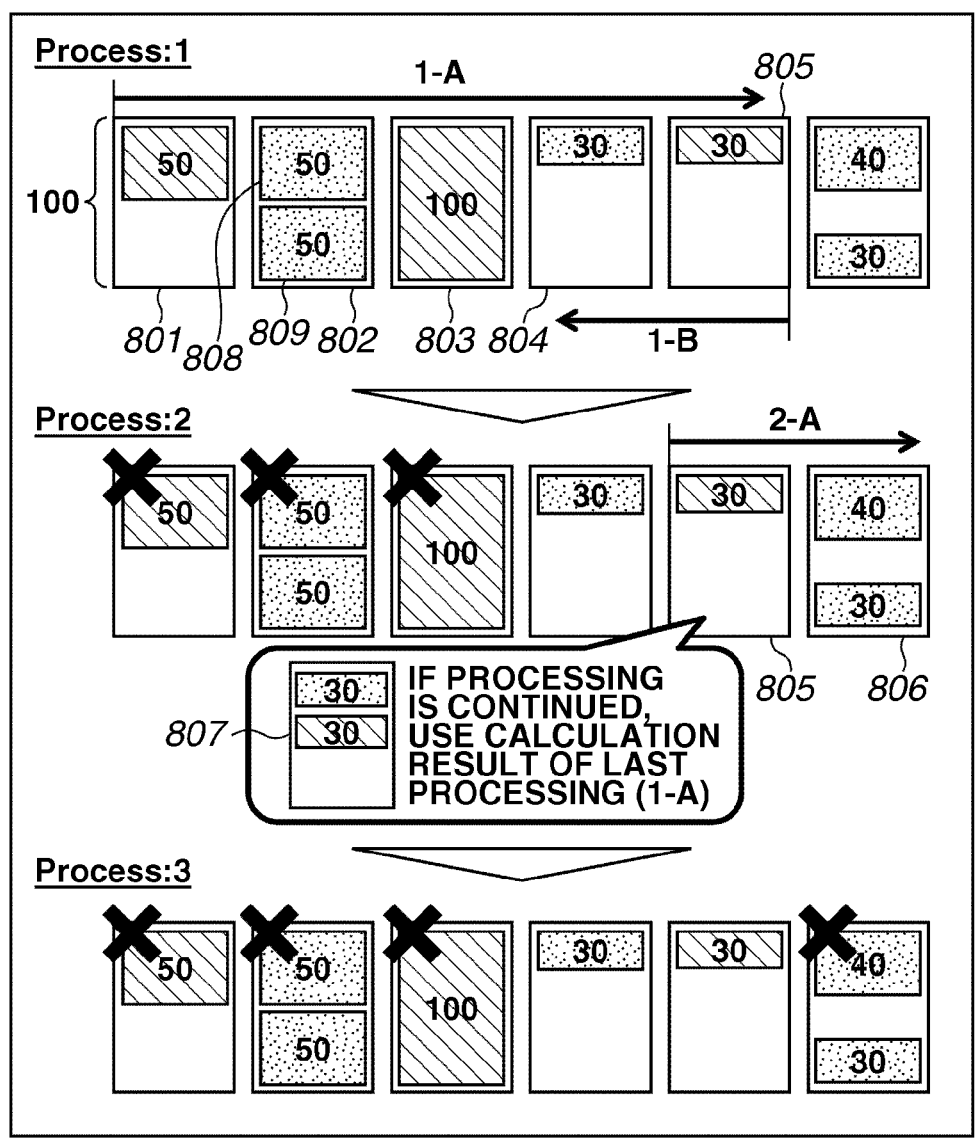
FIG. 7 illustrates scanning processing for a page excluded by page reduction processing.

In step S601, before calculating the reducible page range, the CPU 135 initializes regions ListX and ListY used for storing the page range necessary for reducing one page. The regions ListX and ListY store values indicating values from the starting page to the last page and are temporarily stored in the memory unit 136. According to the present embodiment, two numerical values indicating the starting page and the last page are stored in the memory unit. For example, if pages 801 to 805 in FIG. 7 are stored in the ListX, "801, 805" which indicates the starting page and the last page will be stored. As a different way of storing the data, the CPU 135 stores "801, 802, 803, 804, 805" corresponding to all the page numbers from page 801 to page 805 in FIG. 7 as a list of numerical values. This excluded page selection processing is used for virtually simulating the page reduction processing. Thus, editing operation such as moving objects is not performed.

The starting page is an example of the first page. The last page is an example of the last page.

In step S602, the CPU 135 calculates a page range (first page range) necessary for reducing one page from the top of the document in a forward direction. According to the example in FIG. 7, the CPU 135 calculates the page range according to processing "1-A" of Process: 1. The forward direction is the direction from the top page of the document to the subsequent page. Further, the opposite of the forward direction is a reverse direction which is the direction from the subsequent page to the top page. Since details of the processing in step S602 is described below, only the result of the processing is described. When processing in step S602 is performed according to the processing "1-A" having page 801 as the starting page, the range of pages 801 to 805 is obtained as the page range necessary for reducing one page.

In step S603, the CPU 135 stores the result in the ListX.

In step S605, in processing "1-B", the CPU 135 calculates a page range (second page range) necessary for reducing one page in the reverse direction from the last page of ListX. According to the example in FIG. 7, the CPU 135 calculates the page range from the last page in ListX, which is page 805, in the reverse direction. Since the object in page 804 fits into the blank portion in page 805, the CPU 135 obtains the range of pages 804 to 805 as the result of the calculation. More specifically, the processing in this step is performed by the reducible page range calculation unit 203.

In step S606, the CPU 135 stores the result of the processing in the reverse direction in ListY.

In step S607, after the processing in the forward direction and processing in the reverse direction are finished, the CPU 135 compares the page range of the ListX with the page range of the ListY and determines whether the ListX and the ListY have different values. If the value of the ListY is different from the value of the ListX (YES in step S607), the processing proceeds to step S608. If the value of the ListY is the same as the value of the ListX (NO in step S607), the processing proceeds to step S609.

In step S608, from the difference between the range of the ListX and the range of the ListY, the CPU 135 calculates the excluded page. According to the example in Process: 1 in FIG. 7, while one page can be reduced from a page range of five pages from page 801 to page 805 according to the processing "1-A", one page can be reduced in a page range of two pages from page 804 to page 805 according to the processing "1-B". That is, the page range necessary for the page reduction from page 801 to page 805 is actually the range from page 804 to page 805. Thus, the same result is obtained even if the range from page 801 to page 803 is excluded. Accordingly, the CPU 135 sets pages 801 to 803 as the excluded pages. In other words, since the number of pages included in the page range extracted by the processing "1-B" is smaller than the number of pages included in the page range extracted by the processing "1-A", the page reduction processing for reducing the blank region is performed for the pages in the page range extracted by the processing "1-B".

In step S609, the CPU 315 determines whether a page to be processed remains. If a page to be processed remains (YES in step S609), the processing returns to step S602. According to the example in FIG. 7, since a page to be processed remains, the processing returns to step S602 and the CPU 135 performs the processing in step S602 for the last page stored in the ListX, which is page 805 in FIG. 7, as the starting page.

Next, processing "2-A" in Process: 2 is performed. At this time, the processing result of the processing "1-A" in Process: 1, which is performed just before the processing "2-A", is used to calculate the starting page, which is page 805. Although the result of the processing is described below, according to the example illustrated in FIG. 7, a result 807 is used. Then, the CPU 135 starts the processing "2-A". Since the content in page 806 does not fit into the blank portion of the result 807, the page reduction is not performed and the CPU 135 determines that the processing has reached the last page. If the CPU 135 determines that the processing has reached the last page (YES in step S604), the processing proceeds to step S610.

In step S610, the CPU 135 sets a page, which is newly set as a scanning target page, as an excluded page. According to the example of the processing "2-A" in FIG. 7, the processing "2-A" is to be performed for pages 805 and 806. However, since page 805 is processed by the processing "1-A" and "1-B" in the preceding Process: 1, the page set as the excluded page in step S610 is page 806 only.

According to the above-described processing, the CPU 135 obtains the result of Process: 3 illustrated in FIG. 7 where the excluded pages are set.

Figure 8:
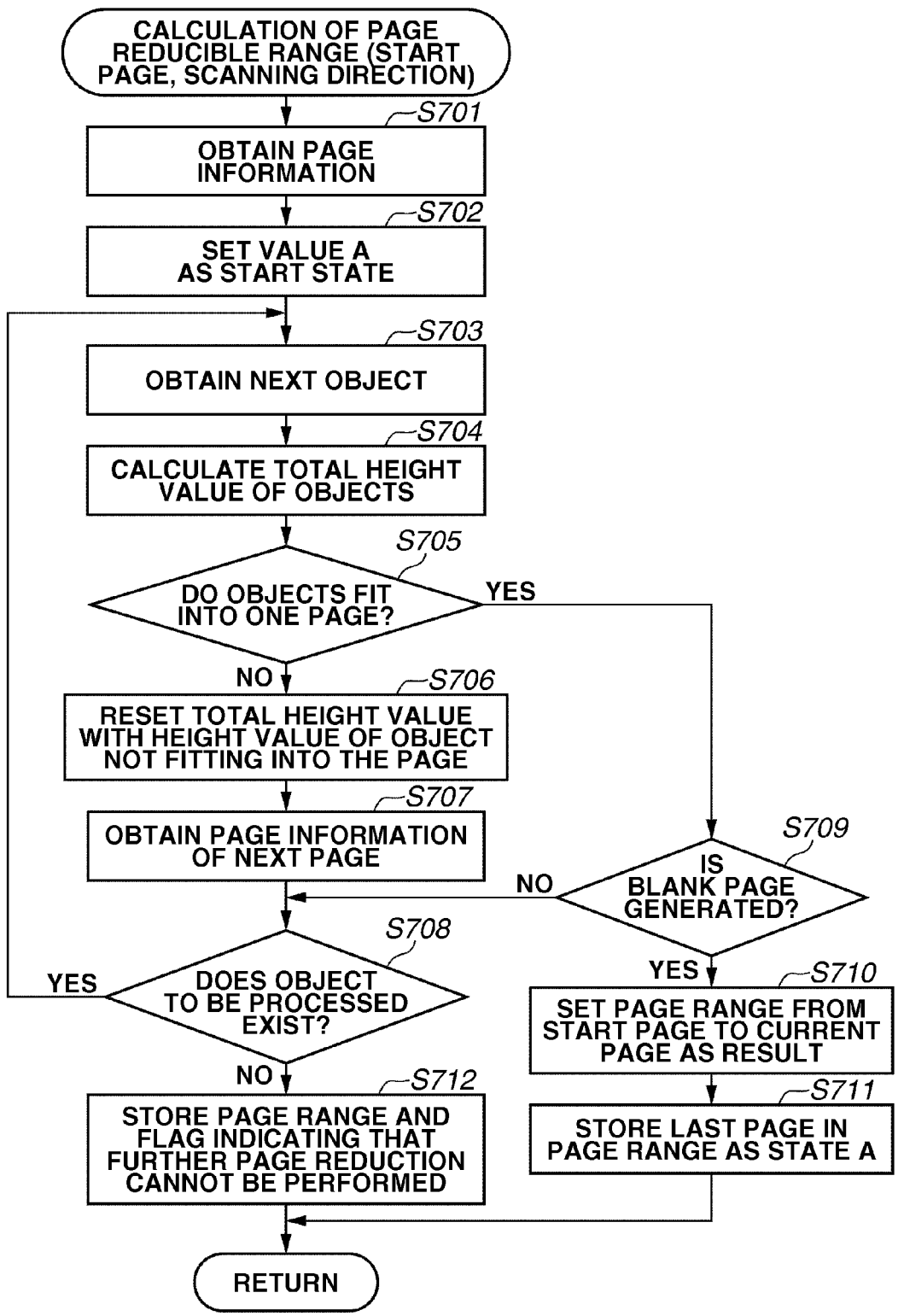
FIG. 8 is a flowchart illustrating details of reducible page range calculation processing.

FIG. 8 is a flowchart illustrating details of the processing in step S602. The processing is described with reference to the processing "1-A" and "2-A" in FIG. 7.

According to the present embodiment, the CPU 135 uses a "height" of an object or a page in determining whether the object can be moved from a page to the next page. According to the example in FIG. 7, the height of the page is set to 100. Further, a numerical value in each object indicates the height of the object. For example, since an object of a height 50 exists in page 801, the height of the remaining blank portion of page 801 is 50. This is obtained by subtracting the height of the object 50 from the height 100 of the page. When the CPU 135 actually calculates the blank portion, the CPU 135 calculates a top margin, a bottom margin, and a minimum blank portion between objects which is required for objects not to overlap with each other.

In step S701, the CPU 135 obtains information, especially about the height, of a page. To be more precise, according to the example of the processing "1-A", the CPU 135 obtains the height value 100 of page 801 and performs initialization. In addition to the size information, the CPU 135 can also obtain additional information such as chapter information, information on whether the document is monochromatic or color, and information indicating a particular page, for example, a title page. Information about a page other than a page designated as the starting page can be obtained as the initial page. According to the example illustrated in FIG. 7, information about a page other than page 801, which is designated as the starting page, can be obtained. For example, information about page 802 can be obtained. In step S702, the CPU 135 sets a value of a starting state (a state of the starting page) as a value of a state A. As described below, the value of the state A is a value of the total height, and the initial value is 0.

In step S703, after obtaining the height of the page, the CPU 135 obtains an object as a target to be moved in the next processing. According to the example in FIG. 7, the CPU 135 obtains an object 808 in the upper portion of page 802.

In step S704, the CPU 135 obtains a total value of the height of the obtained object and the height of the object in the initial page. According to the example in FIG. 7, the CPU 135 obtains a total value 100 by adding the height 50 of the obtained object and the height 50 of the object in page 801.

In step S705, the CPU 135 determines whether the objects fit into one page. In other words, the CPU 135 determines whether the total value does not exceed the height of one page. According to the example in FIG. 7, since the calculated total value 100 does not exceed the height 100 of one page (YES in step S705), the CPU 135 determines that the obtained object fits into the page, and the processing proceeds to step S709.

In step S709, the CPU 135 determines whether a blank page is generated. If a blank page is not generated (NO in step S709), the processing proceeds to step S708. In step S708, the CPU 135 determines whether an object to be processed exists. If an object to be processed exists (YES in step S708), the processing returns to step S703. In step S703, the height of the next object (e.g., height of an object 809 in the lower portion of page 802 in FIG. 7) is obtained.

In step S704, the CPU 135 adds the height of the object to the total height. According to the example in FIG. 7, the height 50 of the object 809 is added to the total height 100.

In step S705, since the total height 150 does not fit into one page (exceeds the page height 100) (NO in step S705), the processing proceeds to step S706. In step S706, the CPU 135 resets the total height using the height of the object (the height 50 of the object 809), which is not fitted into the page.

In step S707, the CPU 135 obtains the height information of the next page. According to the example in FIG. 7, the CPU 135 obtains the height information of page 802.

The CPU 135 performs similar processing for pages 803 and 804. More precisely, the height of the object in page 803 is 100. Accordingly, the object does not fit into one page when the object's height value is added to the total value 50. Thus, the CPU 135 initializes the total value. According to the example in FIG. 7, the total value is initialized and set to 100. Then, a total value 130 is obtained by adding the initialized total value, which is 100, to the height of the object in page 804, which is 30. Since the total value 130 does not fit into one page, the CPU 135 initializes the total value. In this case, the total value is initialized and set to 30.

In step S709, the CPU 135 determines whether a blank page is generated. According to the example in FIG. 7, since the total value of the current height 30 and the height of the object in page 805, which is 30, is 60, the object fits into the page. Thus, the CPU 135 determines that a blank page is generated (YES in step S709), and the processing proceeds to step S710. The generation of a blank page means that all the objects in page 805 fits into page 804.

In step S710, since a blank page is generated, the CPU 135 sets the page range from page 801 (starting page) to page 805 (current page) as a result. In step S711, the CPU 135 stores the state A of the last page in the page range as a result. The state A according to the present embodiment is, for example, the total value 60 of the height of the result 807 in FIG. 7. Thus, a numerical value "60" is stored. This value is stored in the memory unit 136 by the CPU 135 and read out by the CPU 135 as needed.

In step S702, if processing is started again using a result of the previous processing, the CPU 135 sets the state of the starting page to the state A. According to the example in FIG. 7, when the processing "2-A" is started, the CPU 135 sets the state of the starting page by using the state A (result 807) which is stored. As a result, the objects in page 806 do not fit into the blank portion of the result 807 (NO in step S705), and an object to be processed does not exist (NO in step S708). Then, the processing proceeds to step S712. In step S712, the CPU 135 stores a flag, which indicates that further page reduction cannot be performed, and a page range.

According to the present embodiment, a blank page (blank page 511) can be efficiently generated. Further, since useless layout change of objects is not performed, enhanced print quality can be achieved.

According to the layout processing of the first exemplary embodiment, if a plurality number of pages are laid out and printed on one sheet of paper, a blank space may be generated. In other words, if four pages are laid out on one sheet and if 12 pages are reduced to 9 pages according to the processing in the first exemplary embodiment, only one page is printed on the last paper and three-quarters of the paper will be blank. Further, since the number of sheets is not reduced, the page reduction processing for three pages is not necessary.

According to the second exemplary embodiment of the present invention, the CPU 135 simulates, in advance, the maximum number of pages which can be reduced and determines a number of target reduction pages. Based on this number of target reduction pages, appropriate page reduction processing can be performed in accordance with the print format information. The print format information includes, for example, setting of two-sided printing and setting of the layout number indicating the number of pages to be laid out on one side of a print sheet. If four-page layout is set as the layout number, four pages will be arranged on one side of a print sheet.

Figure 9:
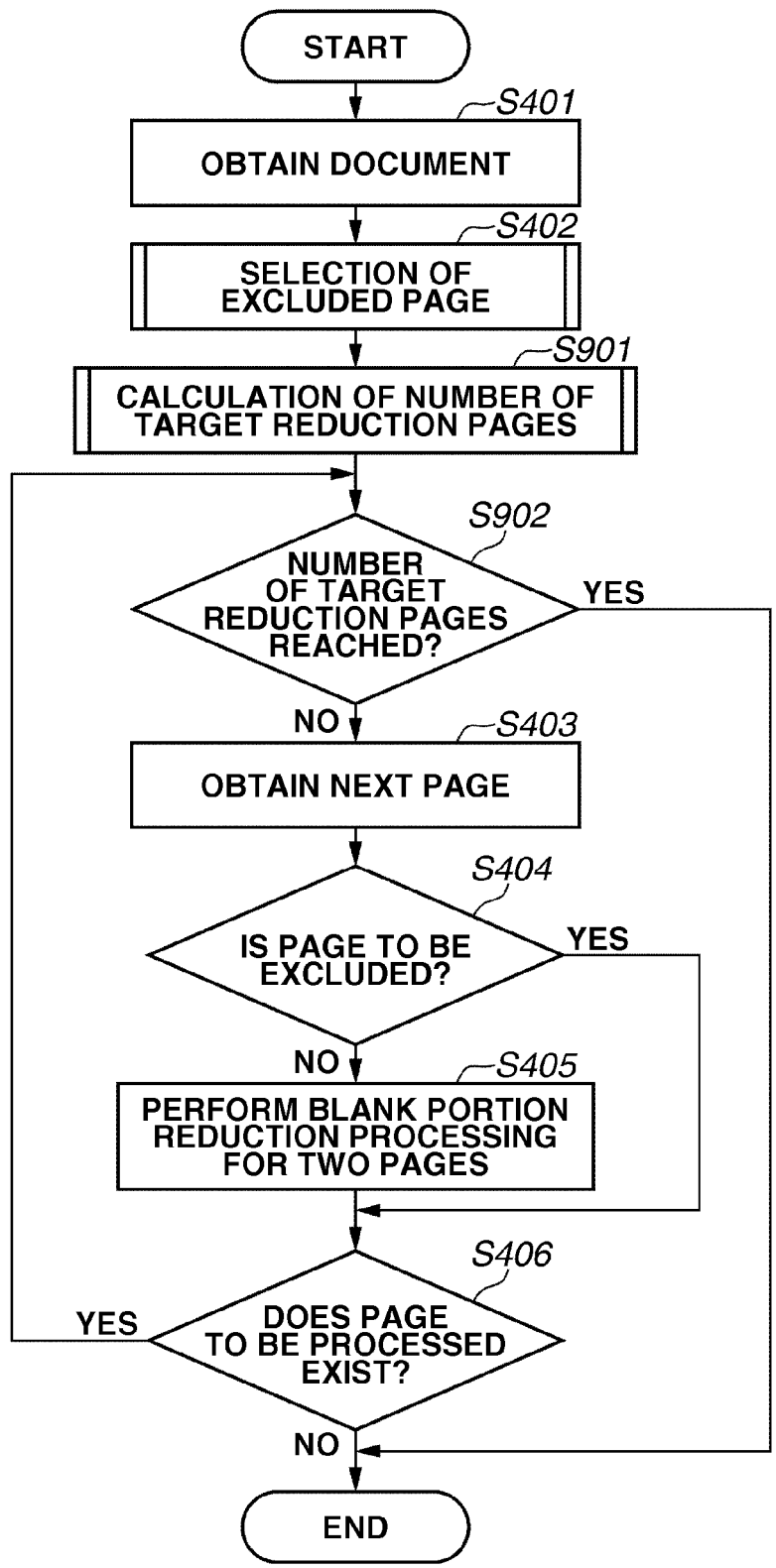
FIG. 9 is a flowchart illustrating an example of processing for adjusting a number of reduction pages based on print format information according to a second exemplary embodiment of the present invention.

FIG. 9 is a flowchart illustrating an example of adjusting the number of pages to be reduced according to the print format information. This flowchart is similar to the flowchart in FIG. 5 except that steps S901 and S902 are added.

In step S901, the CPU 135 calculates the number of target reduction pages. Although details of this processing is described below, for example, if two pages are laid out on one side of a sheet of paper and if a five-page document is reducible to three pages, the number of target reduction pages will be four. More specifically, the processing in this step is performed by the target reduction page calculation unit 304.

In step S902, the CPU 135 determines whether the number of pages of the document has reached the number of target reduction pages as a result of the page reduction. If the number of sheets used for the printing is not reduced even if the number of pages can be reduced, the CPU 135 does not perform the blank portion reduction processing, and the processing in FIG. 9 ends. Since steps S403 to S406 in FIG. 9 are described in the first exemplary embodiment, their descriptions are not repeated.

According to the processing illustrated in FIG. 9, the page reduction processing is executed when it is determined that the number of reducible pages of the document data reaches the number of target reduction pages. On the other hand, when it is determined that the number of reducible pages does not reach the number of target reduction pages, the page reduction unit is controlled not to execute the page reduction processing.

Figure 10:
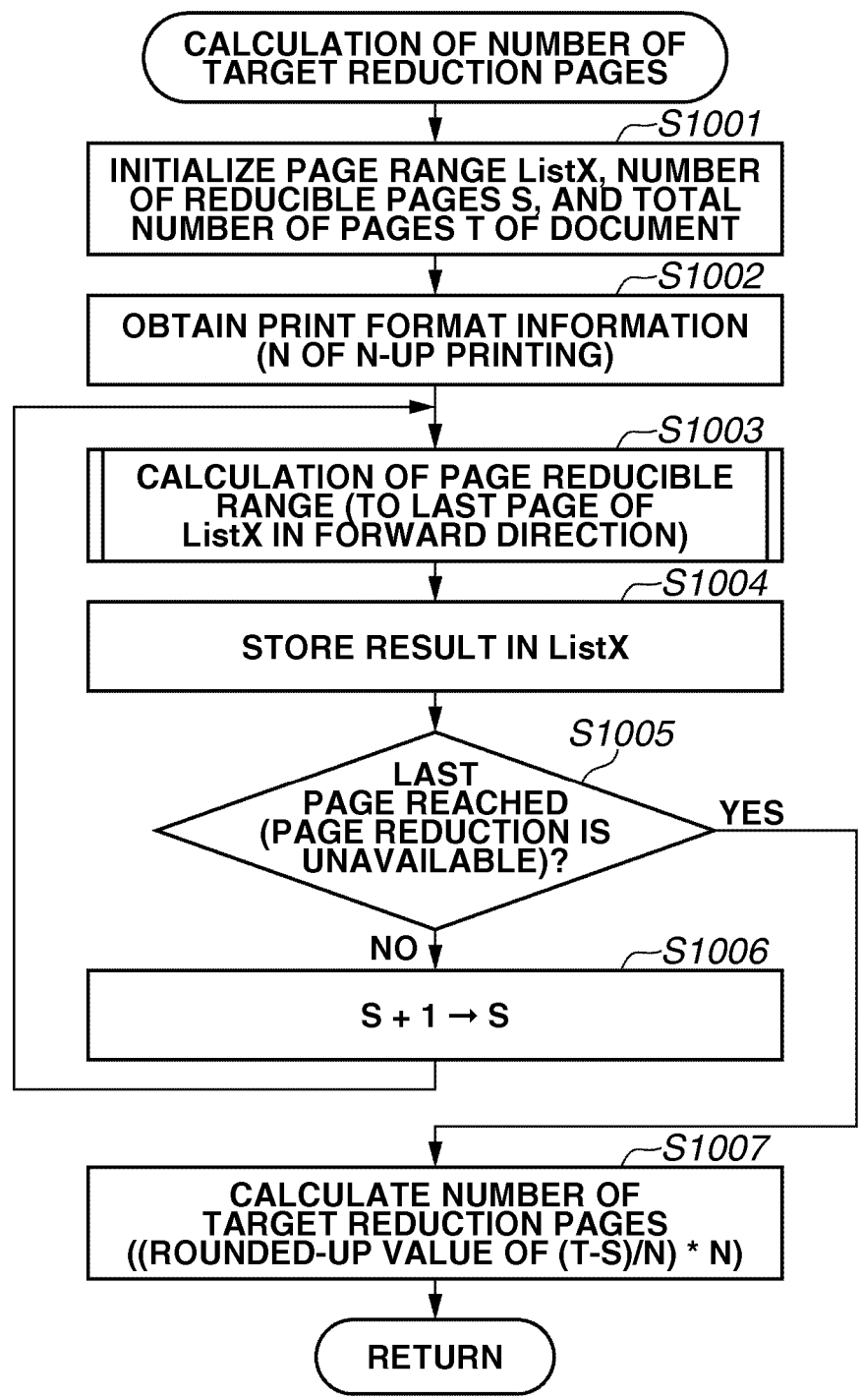
FIG. 10 is a flowchart illustrating details of target reduction page calculation processing.

FIG. 10 is a flowchart illustrating details of the processing in step S901. According to this flowchart, the CPU 135 determines the number of pages which can be reduced by using the processing of the reducible page range calculation in FIG. 8, and based on the confirmed result, the CPU 135 obtains the number of target reduction pages.

In step S1001, the CPU 135 initializes variable values to be used in the flowchart. The page range ListX indicates a range of pages necessary for reducing one page. A number of reducible pages S indicates a maximum number of pages which can be reduced in the document to be processed. A number of pages T of the document indicates a total number of pages of the document.

In step S1002, the CPU 135 obtains print format information. According to the present embodiment, the CPU 135 obtains the number of pages which is laid out on one sheet of paper. For example, if four pages are to be laid out on one side of one sheet of paper, "four" is set as a layout number N.

According to processing in steps S1003 to S1006, the CPU 135 performs the processing below. In step S1003, the CPU 135 obtains a page range necessary for reducing one page until the processing reaches the last page. In step S1004, the CPU 135 substitutes the obtained result in ListX. Since this processing is described above with reference to steps S602 and S603 in FIG. 6, the description of the processing is not repeated. In step S1005, the CPU 135 determines whether the processing has reached the last page. If the page has not yet reached the last page, and, further, it is determined that a page can be reduced (determination that reduction is available is made and a reducible range is received) (NO in step S1005), the processing proceeds to step S1006. In step S1006, the value of the number of reducible pages S is increased by 1. Then, the processing returns to Step S1003.

In step S1005, if the CPU 135 determines that the processing has reached the last page (or the page reduction is unavailable) (YES in step S1005), the processing proceeds to step S1007.

In step S1007, the CPU 135 sets a target reduction value when the processing reaches the last page. The target reduction value is obtained by calculating a difference between the number of pages T and the number of reducible pages S, dividing the difference with the layout number N, and rounding up the fractions. For example, if the number of pages T of the document is 10, the number of reducible pages S is 3, and the layout number N is 4, the value of "(T−S)/N" will be 1.75. This value is rounded up to 2. Then, the number of target reduction pages is obtained by multiplying "2" by "4" (the layout number N), which is "8".

Thus, if a page to be processed exists according to the present embodiment, the page reduction processing is performed until the number of pages is reduced to the number of target reduction pages. According to such processing, appropriate page reduction processing can be realized in accordance with the print format information.

Figure 11:
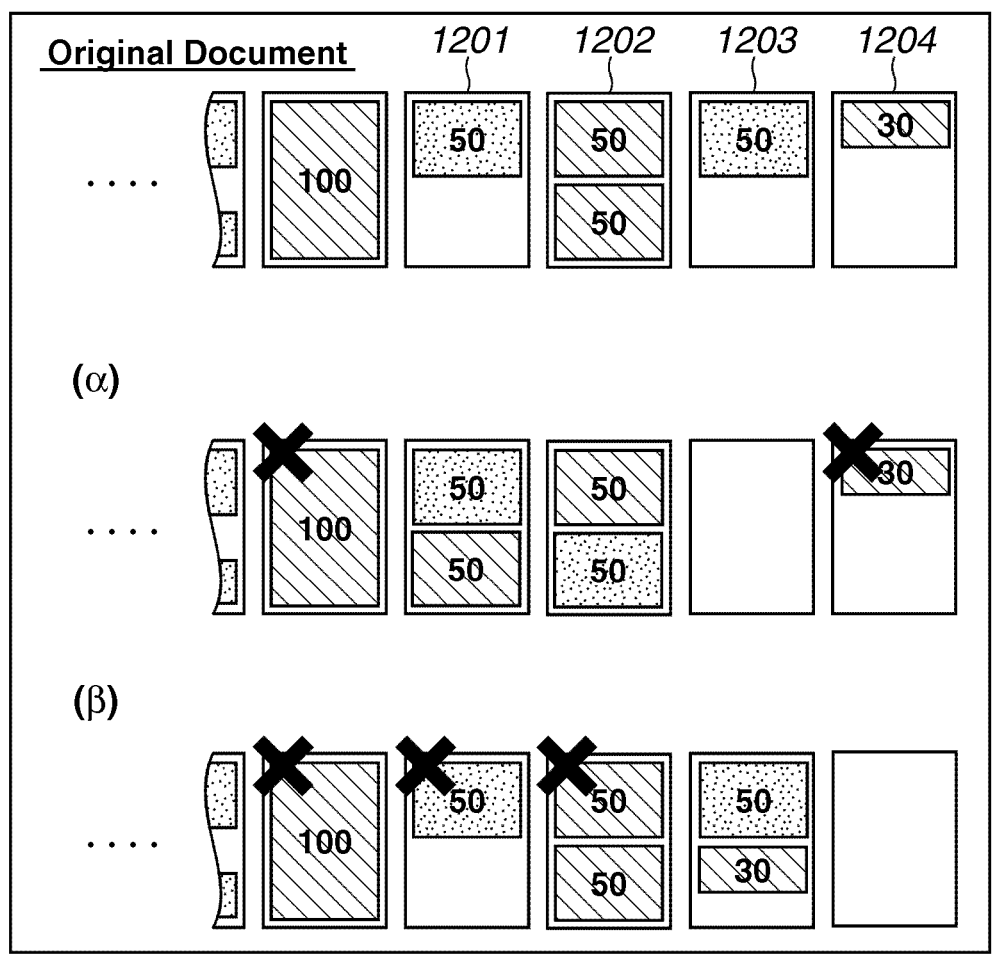
FIG. 11 illustrates effectiveness of processing for a last page portion.

According to the processing of the first exemplary embodiment, in most cases, a last page of a document is not considered as a target of the page reduction processing. However, since a last page of a document is likely to include a large blank portion, the number of pages to be processed can be reduced if the last page is included in the target of the blank portion reduction processing. For example, (α) in FIG. 11 illustrates a result of processing performed according to the first exemplary embodiment. According to the processing of the first exemplary embodiment, out of the last four pages 1201 to 1204 of the document, three pages from page 1201 to 1203 are the target pages and a result of (α) is obtained. However, as illustrated in (β) in FIG. 11, one page can also be reduced when two pages (pages 1203 and 1204) are considered as the target pages.

According to the third exemplary embodiment of the present invention, after processing of the first exemplary embodiment, the CPU 135 performs the reducible page range calculation processing again from the last page in the reverse direction. This can explore the possibility of obtaining the same result by processing a smaller number of pages.

Figure 12:
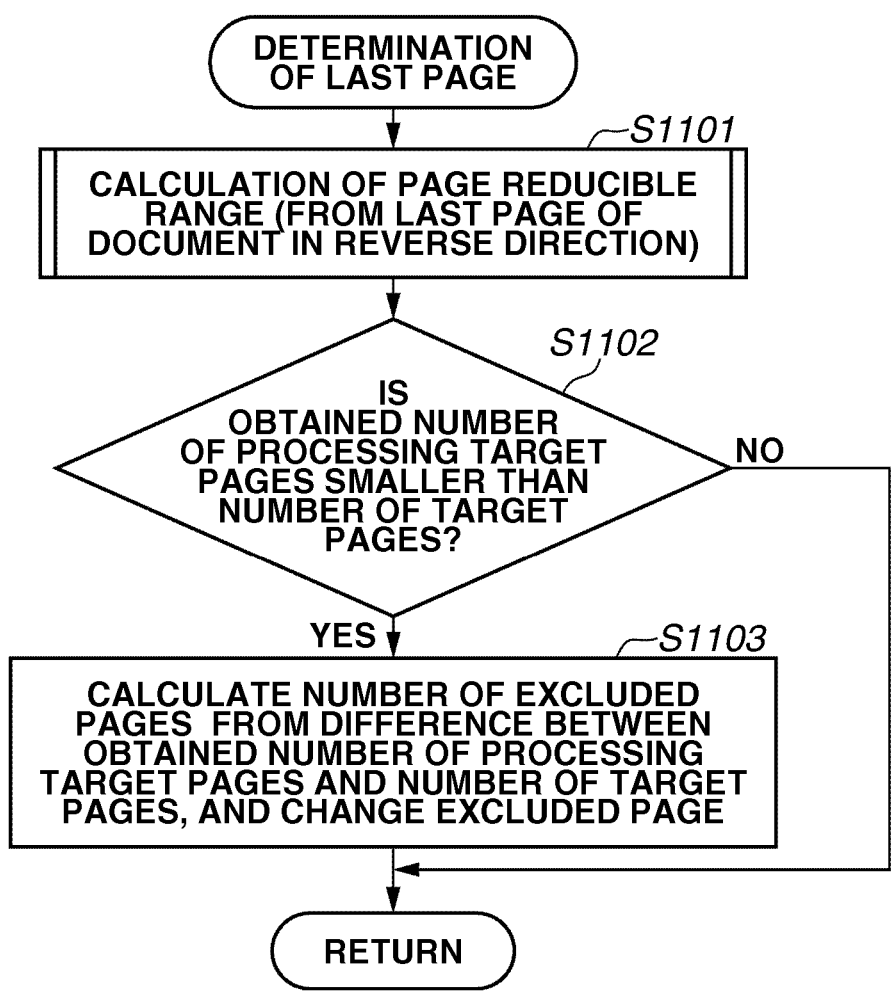
FIG. 12 is a flowchart illustrating a difference between processing of the first exemplary embodiment and processing of a third exemplary embodiment according to the present invention.

FIG. 12 is a flowchart illustrating the difference between the first exemplary embodiment and the present embodiment. The processing illustrated in FIG. 12 is to be included in the processing after step S610 in FIG. 6. This example will be described with reference to FIG. 13.

Figure 13:
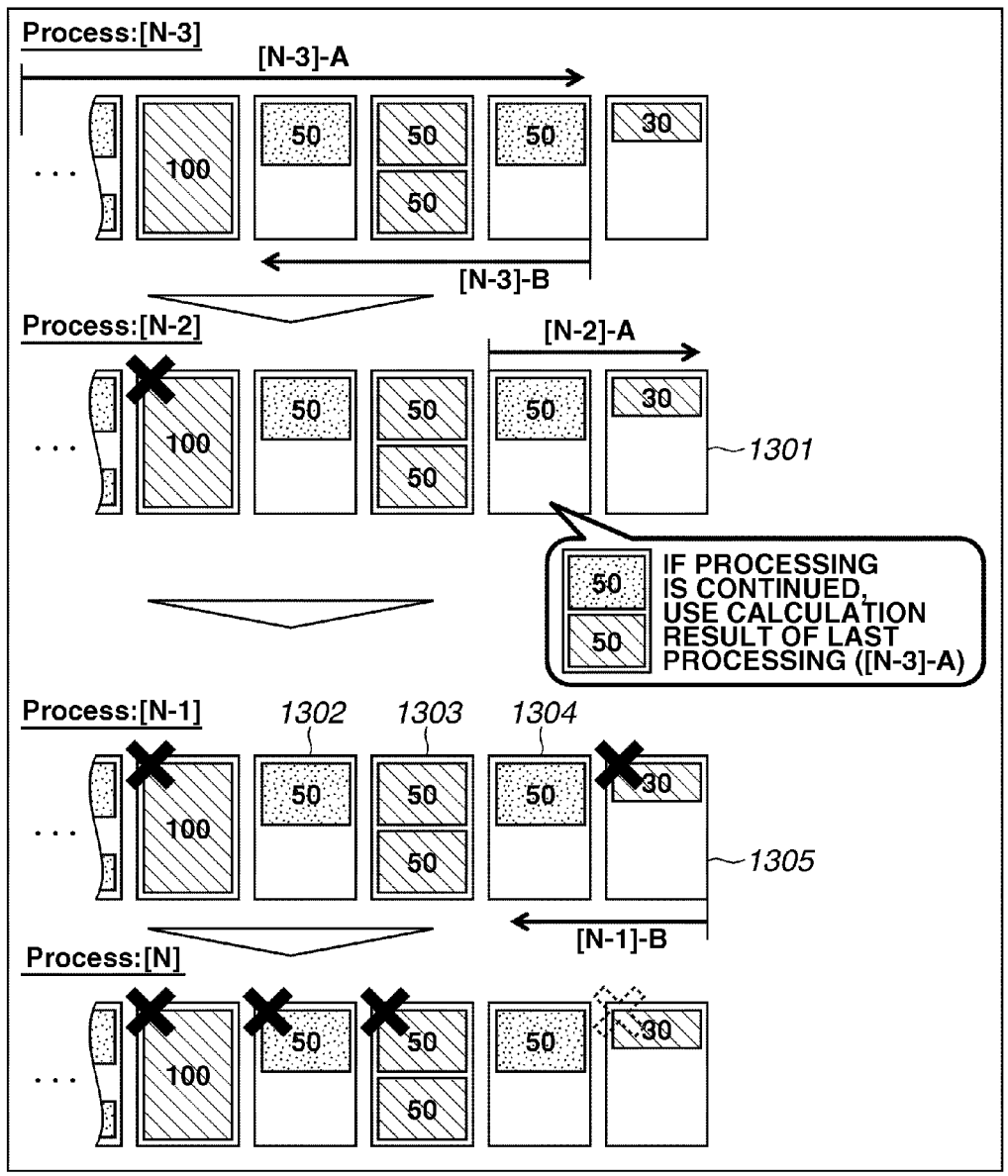
FIG. 13 illustrates processing for the last page portion according to the third exemplary embodiment.

Processing of Process [N−3] and Process [N−2] in FIG. 13 is processing according to the first exemplary embodiment performed by the CPU 135. According to the first exemplary embodiment, in step S610, by processing of "[N−2]-A", the CPU 135 excludes page 1301 from the target of the page reduction processing, and then the processing ends.

According to the present embodiment, in step S1101, the CPU 135 searches for a reducible page range (third page range) from the last page of the document. According to the example in FIG. 13, the CPU 135 searches for a reducible page range by processing "[N−1]-B". As a result of the search, it is determined that one page can be reduced with two pages (pages 1304 and 1305). In step S1102, the CPU 135 determines whether the obtained number of pages is smaller than the number of processing target pages. As a result of the search, since the number of pages (two pages for pages 1304 and 1305) is smaller than the number of processing target pages (YES in step S1102), the processing proceeds to step S1103. In step S1103, the CPU 135 changes the excluded page.

According to the example in FIG. 13, since the number of pages to be processed by the processing "[N−1]-B" is two (pages 1304 and 1305), it is smaller than the number of pages to be processed by processing "[N−3]-B" (three pages for pages 1302 to 1304) in the preceding processing. Thus, the CPU 135 sets page 1305, which has been set as an excluded page in Process [N−1], as a page to be processed, and sets pages 1302 and 1303, which have been set as pages to be processed in the preceding processing "[N−3]-B", as excluded pages. Although page 1304 is regarded as a page to be processed in the preceding processing "[N−3]-B", it is also regarded as a page to be processed in the different processing "[N−1]-B". Thus, the CPU 135 does not set page 1304 as an excluded page. More precisely, the processing in FIG. 12 is processing performed by the last page determination unit 301.

According to the above-described processing, determination regarding reduction of the number of processed pages can be performed.

Regarding the layout processing according to the first exemplary embodiment, whether a number of pages can be reduced is determined based on whether an object can be moved to a different page. However, the first exemplary embodiment is not applicable to a case where small objects are moved little by little between pages and processing of a great number of pages is necessary. According to an example of a document in FIG. 14, in order to reduce the number of pages, an object in page 1603 ultimately needs to be moved to a blank portion in page 1602. However, to move the object in page 1603 to page 1602, an object 1605 needs to be moved to page 1601, and further, an object 1604 needs to be moved to a different page. Accordingly, the movement of the objects is influencing the top page.

Figure 14:
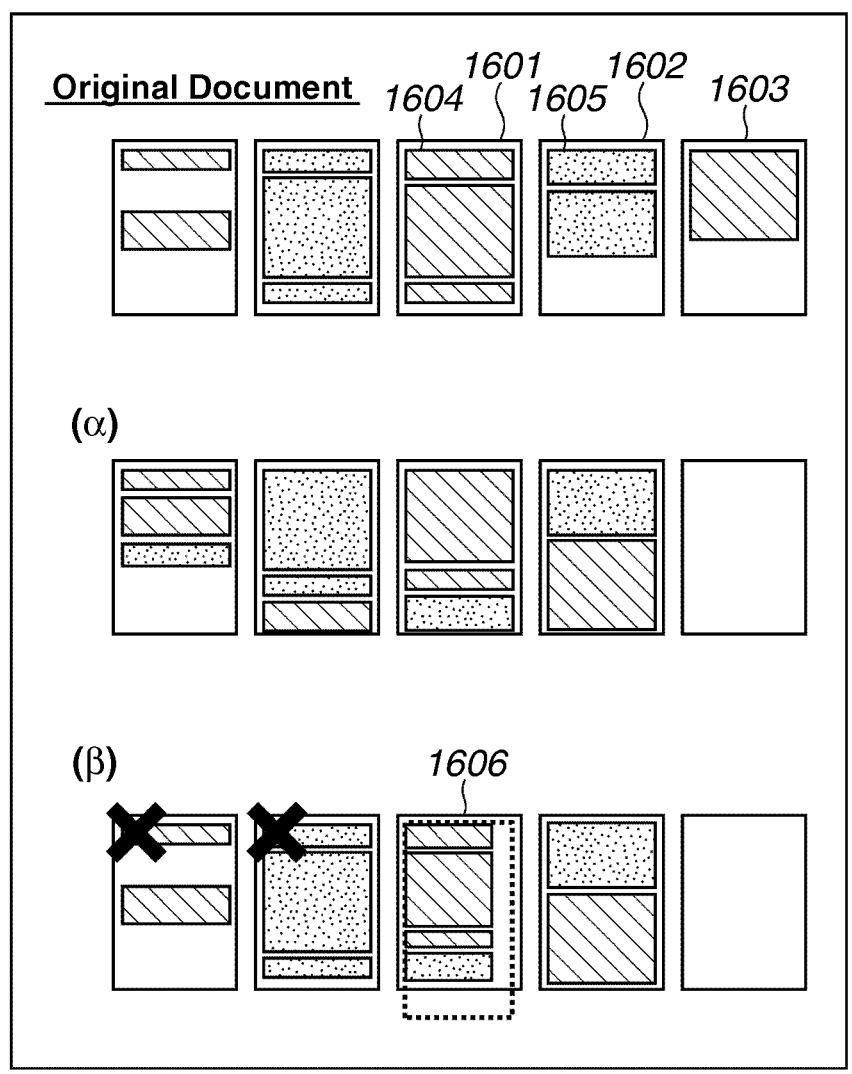
FIG. 14 illustrates blank portion reduction processing including object reduction.

According to the fourth exemplary embodiment of the present invention, the CPU 135 reduces the number of pages to be edited by reducing the size of objects in a page (page 1606 in FIG. 14).

Figure 15:
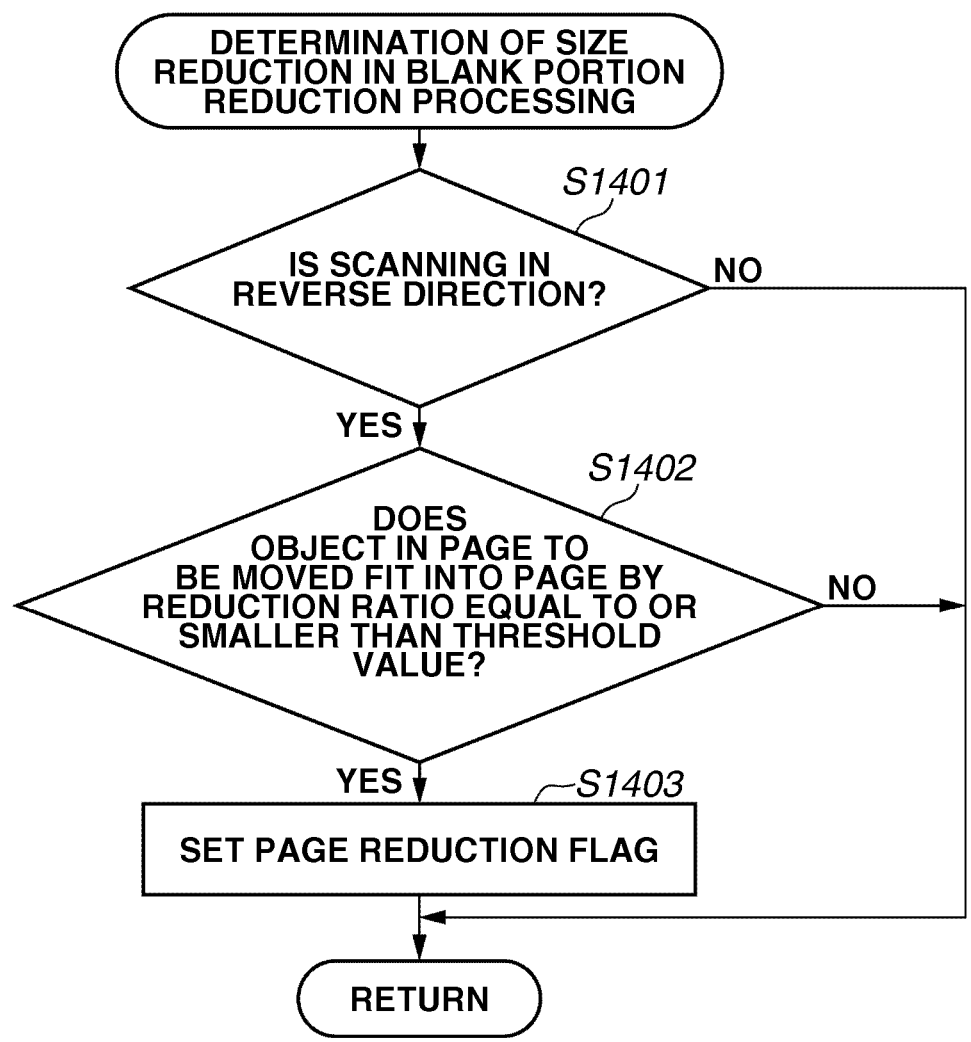
FIG. 15 is a flowchart illustrating a difference between processing of the first exemplary embodiment and a fourth exemplary embodiment of the present invention.
Figure 16:
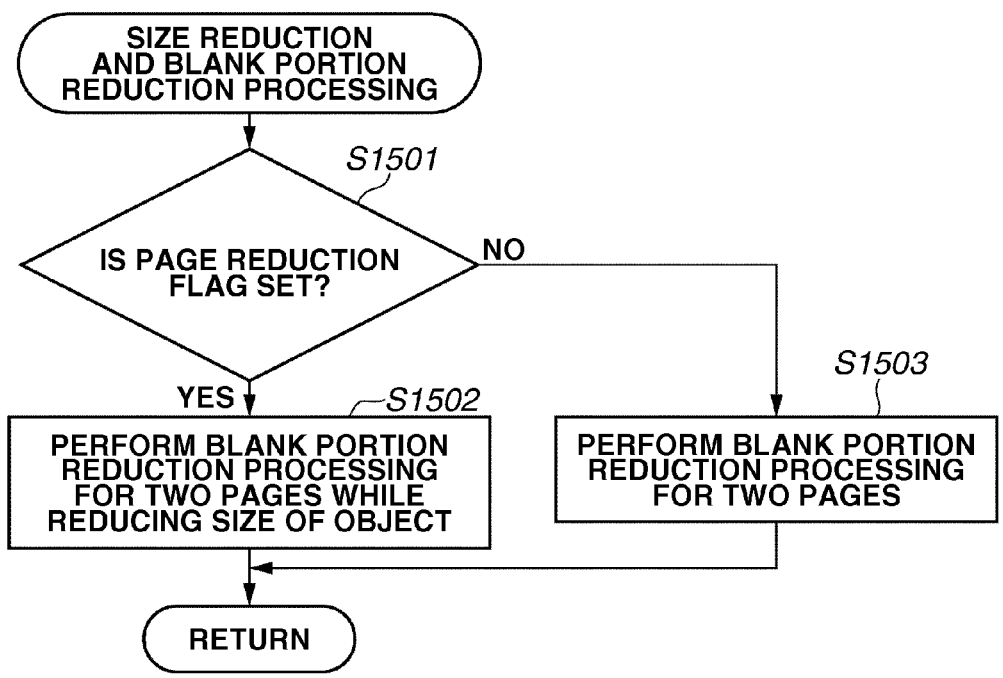
FIG. 16 is a flowchart illustrating a difference between processing of the first exemplary embodiment and the fourth exemplary embodiment.

FIGS. 15 and 16 are flowcharts illustrating the difference in processing between the first exemplary embodiment and the present embodiment. The processing in FIG. 15 is to be included in the processing after step S704 in FIG. 8. The processing in FIG. 16 replaces step S405 in FIG. 5. The flowcharts are described with reference to FIG. 14.

In step S1401 in FIG. 15, the CPU 135 determines whether the reducible page range is searched in the reverse direction. If the CPU 135 determines that the page range is searched in the reverse direction (YES in step S1401), the processing proceeds to step S1402. In step S1402, the CPU 135 determines whether an object in a page to be moved fits into a page by a reduction ratio equal to or smaller than a predetermined threshold value. If the CPU 135 determines that the object fits into the page by a reduction ratio equal to or smaller than the predetermined threshold value (YES in step S1402), the processing proceeds to step S1403. In step S1403, the CPU 135 sets a reduction flag to the page. Then, the CPU 135 sets the reduction flag in a page portion of the document stored in the memory unit 136. This data can be stored in the memory unit 136 as a reduction page list or added to the data stored in the storage device 139 as additional information. Further, the value used in the determination of the object size reduction in step S1402 is a value set and stored by the user in the storage device 139 in advance as initial information. The value used in the determination can also be a value input by the user via a setting screen displayed by the CPU 135.

More precisely, the processing in FIG. 15 is processing performed by the size reduction determination unit 302 in the blank portion reduction processing.

In step S1501 in FIG. 16, the CPU 135 determines whether the page reduction flag is set before performing the blank portion reduction processing. If the page reduction flag is set (YES in step S1501), the processing proceeds to step S1502. In step S1502, the CPU 135 performs the blank portion reduction processing while performing the size reduction processing of the objects as page 1606 illustrated in FIG. 14. On the other hand, if the page reduction flag is not set (NO in step S1501), the processing proceeds to step S1503. In step S1503, the CPU 135 performs the normal blank portion reduction processing.

According to the above-described operation, even if small objects are included in a plurality of pages, the number of editing pages can be effectively reduced.

Figure 17:
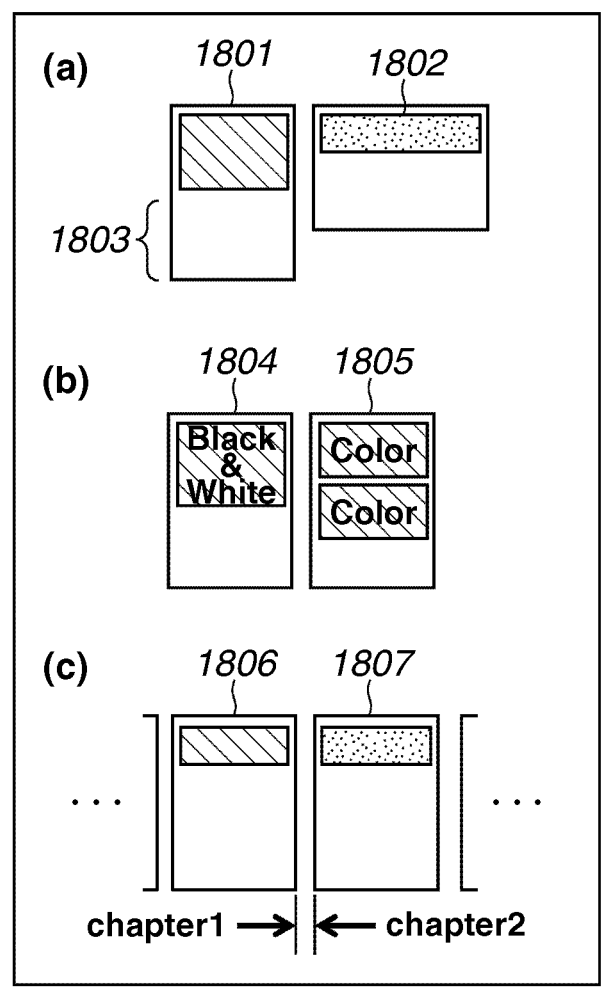
FIGS. 17A, 17B and 17C illustrate expanded processing associated with the determination of the blank portion reduction processing.

In the determination of the page reduction processing according to the first exemplary embodiment, whether an object can be moved between pages is determined based on a height of the objects. Actually, however, there is a case where whether the object can be moved cannot be determined only by the height. Further, there is a case where the user desires to prevent the movement of the object. FIG. 17A illustrates an example of a case where whether an object can be moved cannot be determined only by the height. Although the height of an object 1802 is smaller than the height of a blank space 1803, the width of the object 1802 is wider than the width of a page 1801. Accordingly, the object 1802 cannot be moved to page 1801.

Further, FIGS. 17B and 17C illustrate examples of a case where the movement of an object to a different page is prevented. According to the example in FIG. 17B, a page 1804 is a monochromatic page and a page 1805 is a color page. In this case, if a color object in page 1805 is moved to page 1804, page 1804 is considered as a color page. If the user does not desire to increase the number of high-cost color pages, it is desirable that the user can prevent movement of such an object. Further, according to the example illustrated in FIG. 17C, the chapter including the object in page 1806 and the chapter including the object in page 1807 are different. In such a case, the user may desire to prevent the object from being moved between pages in order not to combine the content of different chapters. In such a case, the chapter information is input separately from software of a higher level than the software that realizes the processing of the fifth exemplary embodiment of the present invention. The document may be structured or the chapter information may be set in advance as additional information of the document, and the information may be readable by the CPU 135.

Figure 18:
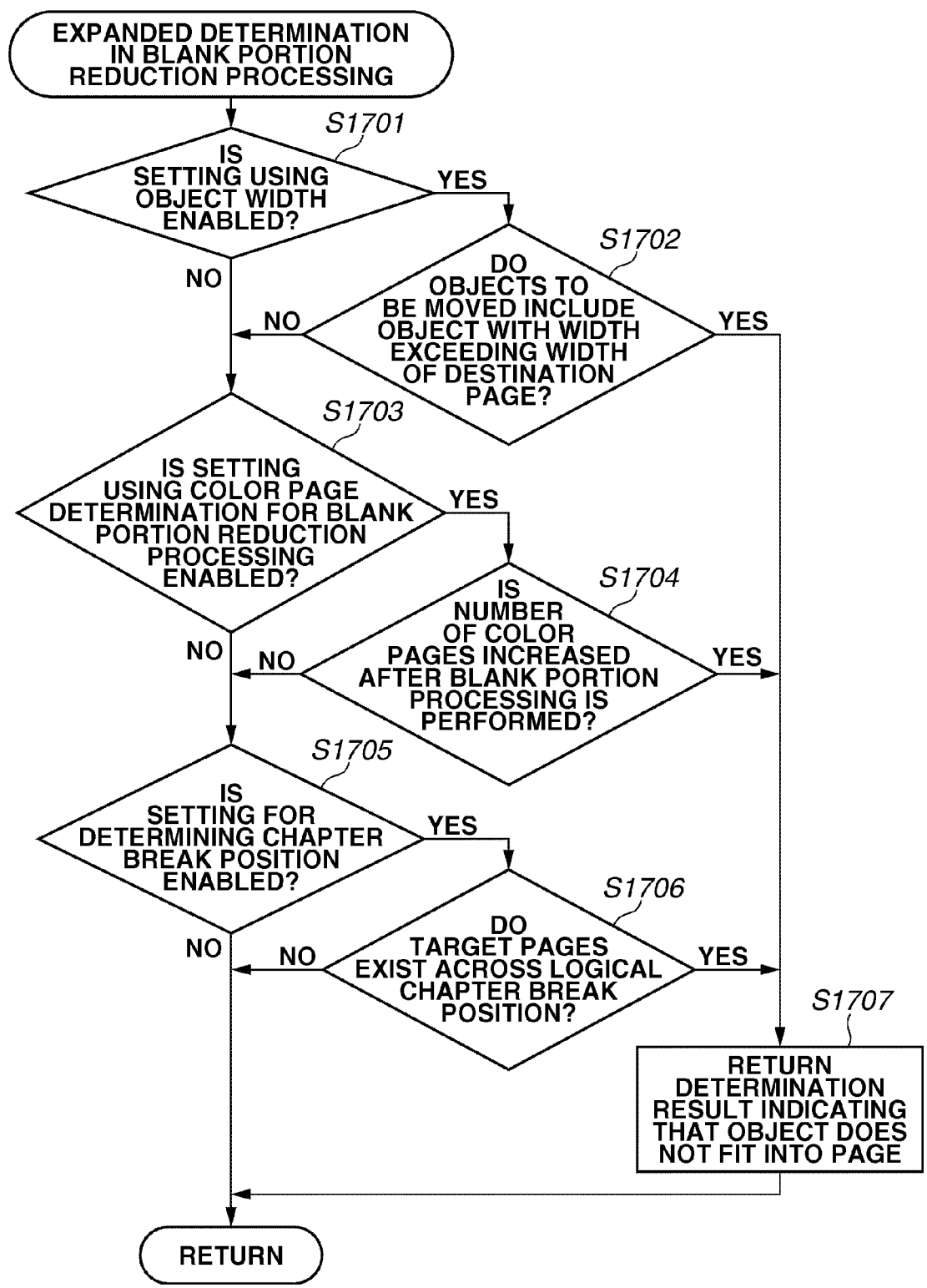
FIG. 18 is a flowchart illustrating a difference between the first exemplary embodiment and a fifth exemplary embodiment of present invention.

FIG. 18 is a flowchart illustrating a difference between processing of the first exemplary embodiment and processing of the present embodiment. The processing in FIG. 18 is to be included in the processing just before step S705 in FIG.

Figure 19:
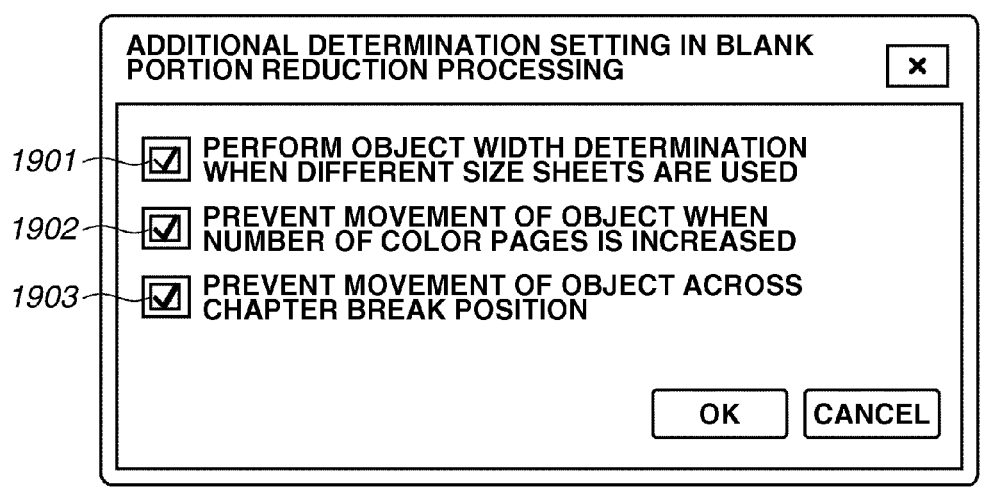
FIG. 19 illustrates an example of a setting screen displaying additional determination associated with the blank portion reduction processing according to the fifth exemplary embodiment.

8. In step S1701, the CPU 135 determines whether the setting using an object width is enabled. If the setting is not enabled (NO in step S1701), the processing proceeds to step S1703. If the setting is enabled (YES in step S1702), the processing proceeds to step S1702. In step S1702, the CPU 135 determines whether any object with the width exceeding the width of the destination page exists. If such an object exists (YES in step S1702), the processing proceeds to step S1707. If such an object does not exist (NO in step S1702), the processing proceeds to step S1703. In step S1703, the CPU 135 determines whether setting using color page determination for blank portion reduction processing is enabled. If such setting is enabled (YES in step S1703), the processing proceeds to step S1704. If such setting is disabled (NO in step S1703), the processing proceeds to step S1705. In step S1704, the CPU 135 determines whether, as a result of the blank portion reduction processing, the number of color pages is increased. If the number of color pages is increased (YES in step S1704), the processing proceeds to step S1707. If the number of color pages is not increased (NO in step S1704), the processing proceeds to step S1705. In step S1705, the CPU 135 determines whether setting for determining chapter break position is enabled. If such setting is enabled (YES in step S1705), the processing proceeds to step S1706. If such setting is disabled (NO in step S1705), the processing of this flowchart ends. In step S1706, the CPU 135 determines whether the target pages of the blank portion reduction processing exist across logical chapter break position. If the target pages exist across the logical chapter break position (YES in step S1706), the processing proceeds to step S1707. If the target pages does not exist across the logical chapter break position (NO in step S1706), the processing of the flowchart ends. In step S1707, the CPU 135 returns the determination result indicating that the object does not fit into the page. According to this processing, the moving of the object can be prevented. Whether to perform the determination can be set by the user via a UI (user interface) screen illustrated in FIG. 19. Check boxes 1901, 1902, and 1903 on the UI screen correspond to steps S1701, S1703, and S1705 in FIG. 18, respectively. If each of the check boxes is ticked, the CPU 135 determines that the setting is valid and performs the determination.

More precisely, the processing in FIG. 18 is performed by the expanded determination unit 303 in the blank portion reduction processing.

By performing the above-described processing, the number of pages to be edited can be effectively reduced even if whether an object can be moved cannot be determined only by the height or the user desires not to move the object.

Further, the above-described exemplary embodiments can also be achieved by supplying a software program that realizes each function of aforementioned exemplary embodiments to a system or an apparatus via a network or various types of storage media, and a computer (or a CPU or an MPU (microprocessor unit)) in the system or the apparatus reads and executes the program stored in such storage media.

According to each of the above-described exemplary embodiments, the number of pages can be efficiently reduced. Further, processing time necessary for reducing pages can be reduced and a decrease in layout quality can be suppressed. Thus, according to the exemplary embodiments of the present invention, efficient page reduction processing can be realized.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-043793 filed Feb. 29, 2012, which is hereby incorporated by reference herein in its entirety.

What is claimed is:

1. An information processing apparatus comprising a processor and a memory which stores a computer program, wherein the processor executes the computer program to function as:
   a first obtaining unit configured to obtain a first page range required for reducing one page of document data by scanning pages of the document data in a forward direction, the forward direction being a direction from a first page to a last page of the document data;
   a second obtaining unit configured to obtain a second page range required for reducing one page of the document data by scanning pages of the document data in a reverse direction from a last page of the first page range obtained by the first obtaining unit, the reverse direction being a direction opposite to the forward direction;
   a page reduction unit configured to execute page reduction processing by reducing a blank region included in a page in the second page range if a number of pages included in the second page range is smaller than a number of pages included in the first page range.

2. The information processing apparatus according to claim 1, wherein the processor further functions as a selection unit configured to select a page of difference between the first page range and the second page range as a page to be excluded from a target of the page reduction processing executed by the page reduction unit.

3. The information processing apparatus according to claim 1, wherein the processor further functions as a third obtaining unit configured to obtain a third page range required for reducing one page of the document data by scanning the document data from the last page of the document data to the first page of the document data, and wherein the page reduction unit executes page reduction processing by reducing a blank region included in a page in the third page range if a number of pages included in the third page range is smaller than the number of pages included in the second page range.

4. The information processing apparatus according to claim 1, wherein the first obtaining unit obtains the first page range based on heights of objects included in the pages of the document data in the forward direction, and
   wherein the second obtaining unit obtains the second page range based on heights of objects included in the pages of the document data in the reverse direction from the last page of the first page range.

5. The information processing apparatus according to claim 4, wherein the first obtaining unit obtains the first page range based on the heights and widths of the objects included in the pages of the document data in the forward direction, and wherein the second obtaining unit obtains the second page range based on the heights and widths of the objects included in the pages of the document data in the reverse direction from the last page of the first page range.

6. An information processing method executed by an information processing apparatus, the information processing method comprising:

obtaining a first page range required for reducing one page of document data by scanning the document data in a forward direction, the forward direction being a direction from a first page to a last page of the document data; and obtaining a second page range required for reducing one page of the document data by scanning pages of the document data in a reverse direction from a last page of the obtained first page range, the reverse direction being a direction opposite to the forward direction; and executing page reduction processing by reducing a blank region included in a page in the second page range if a number of pages included in the second page range is smaller than a number of pages included in the first page range.

7. The information processing method according to claim 6, further comprising selecting a page of difference between the first page range and the second page range as a page to be excluded from a target of the page reduction processing.

8. The information processing method according to claim 6, further comprising obtaining a third page range required for reducing one page of the document data by scanning the document data from the last page of the document data to the first page, to extract a third page range required for reducing one page, wherein the page reduction processing is executed by reducing a blank region included in a page in the third page range if a number of pages included in the third page range is smaller than the number of pages included in the second page range.

9. The information processing method according to claim 6, wherein the first page range is obtained based on heights of objects included in the pages of the document data in the forward direction, and wherein the second page range is obtained based on heights of objects included in the pages of the document data in the reverse direction from the last page of the first page range.

10. The information processing method according to claim 9, wherein the first page range is obtained based on the heights and widths of the objects included in the pages of the document data in the forward direction, and wherein the second page range is obtained based on the heights and widths of the objects included in the pages of the document data in the reverse direction from the last page of the first page range.

11. A non-transitory computer-readable storage medium storing a program that causes a computer to perform operations comprising:

obtaining a first page range required for reducing one page of document data by scanning the document data in a forward direction, the forward direction being a direction from a first page to a last page of the document data;

obtaining a second page range required for reducing one page of the document data by scanning pages of the document data in a reverse direction from a last page of the obtained first page range, the reverse direction being a direction opposite to the forward direction; and executing page reduction processing by reducing a blank region included in a page in the second page range if a number of pages included in the second page range is smaller than a number of pages included in the first page range.

12. The non-transitory computer-readable storage medium according to claim 11, further storing a program that causes the computer to select a page of difference between the first page range and the second page range as a page to be excluded from a target of the page reduction processing.

13. The non-transitory computer-readable storage medium according to claim 11, further storing a program that causes the computer to obtain a third page range required for reducing one page of the document data by scanning the document data from the last page of the document data to the first page, wherein the page reduction processing is executed by reducing a blank region included in a page in the third page range if a number of pages included in the third page range is smaller than the number of pages included in the second page range.

14. The non-transitory computer-readable storage medium according to claim 11, wherein the first page range is obtained based on heights of objects included in the pages of the document data in the forward direction, and wherein the second page range is obtained based on heights of objects included in the pages of the document data in the reverse direction from the last page of the first page range.

15. The non-transitory computer-readable storage medium according to claim 14, wherein the first page range is obtained based on the heights and widths of the objects included in the pages of the document data in the forward direction, and wherein the second page range is obtained based on the heights and widths of the objects included in the pages of the document data in the reverse direction from the last page of the first page range.

* * * * *